Jan. 30, 1940.　　　　N. C. HUGUS　　　　2,188,436
ALTERNATING CURRENT RECTIFYING CIRCUIT
Filed April 7, 1937
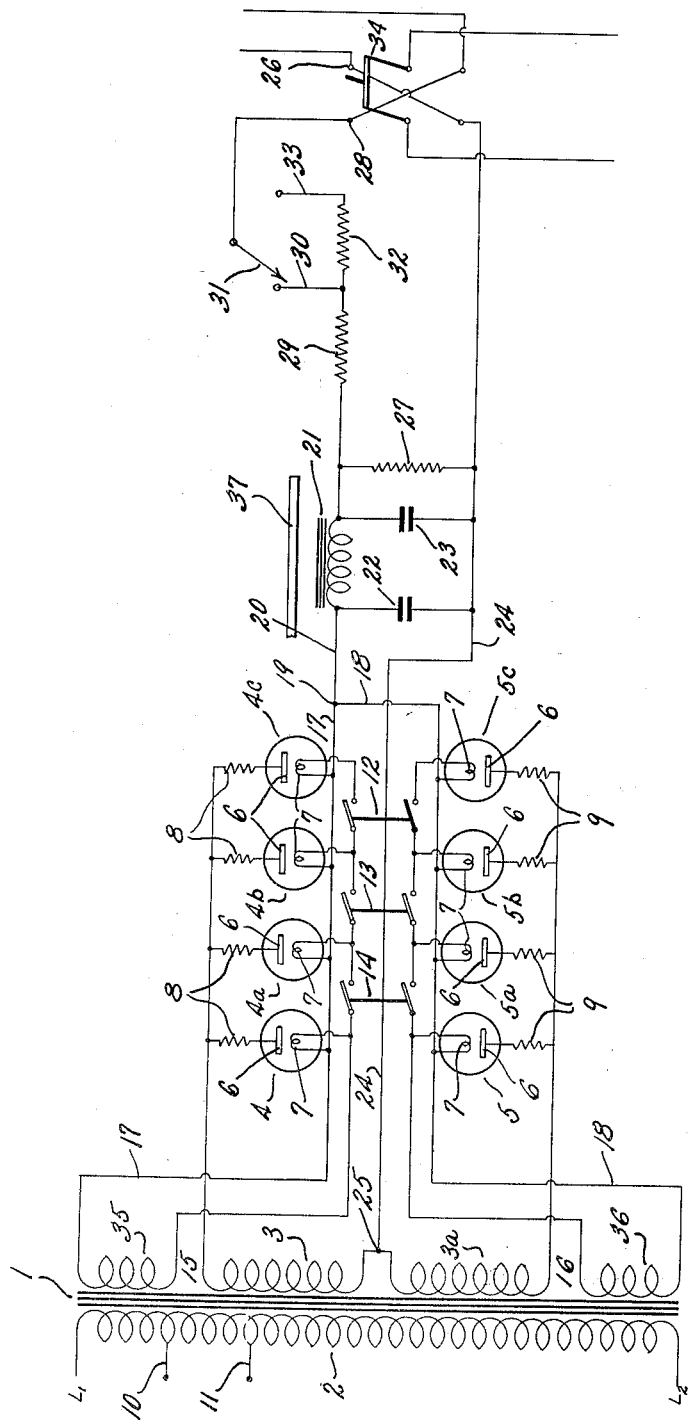
INVENTOR
NEIL CARLTON HUGUS
BY
John Mahoney
ATTORNEY Patented Jan. 30, 1940

2,188,436

UNITED STATES PATENT OFFICE 2,188,436

ALTERNATING CURRENT RECTIFYING CIRCUIT

Neil Carlton Hugus, Jackson, Mich., assignor to Argus Manufacturing Corporation, Cleveland, Ohio, a corporation of Ohio Application April 7, 1937, Serial No. 135,371

10 Claims. (Cl. 175—363)

My invention relates to a process and to apparatus for rectifying alternating current and more particularly to apparatus and a process of this type in which the full alternating current wave is rectified and a direct current is produced which is low in or substantially free from alternating current pulsations.

In converting alternating current into direct current for various purposes, such as electric arc welding, charging batteries, electroplating, electrolytic hydrogen and oxygen plants, resistance measuring, D. C. solenoid hammers, and the like, it has heretofore been the practice to utilize motor-generator sets, mercury arc rectifiers or rotary converters.

It has also been proposed to utilize half-wave rectification in which gas filled rectifier tubes are employed. In such apparatus, however, the current which is rectified contains a considerable amount of alternating current pulsations which impairs its use for direct current purposes. This is particularly true in electric arc welding because it is highly advantageous in this type of work to provide a stable arc.

The present invention provides an improved apparatus and process of producing direct current from alternating current by means of which both waves of a single phase alternating current may be rectified in a manner to produce direct current which is comparatively free from alternating current pulsations. My invention also includes means to filter the current to diminish still further the alternating current pulsations as well as to provide a direct current which is low in direct current pulsations. Another feature of my invention is to provide economical means for readily increasing or diminishing the amperage to correspond to that desired at the load.

It is therefore an object of my invention to provide an improved electric circuit including a plurality of gaseous filled rectifier tubes of the diode type for rectifying alternating current by means of which both halves of the waves of a single phase alternating current may be rectified and a direct current produced that is low in or substantially free from both alternating and direct current pulsations.

Another object of my invention is to provide an improved electric circuit including a plurality of gaseous filled rectifier tubes by means of which one-half the wave of each cycle is passed through a tube or series of tubes connected in parallel, the other half of the wave is passed through another tube or series of tubes connected in parallel, and the pulsating current is united to form a current, the pulsations of which are not affected by alternating current components.

A further object of my invention is to provide means for eliminating or adding gaseous filled tubes in pairs to increase or decrease the current output, one of the tubes of each pair being connected to one terminal of the secondary winding and the other tube of each pair being connected to the other terminal of the secondary winding.

My invention will be better understood by reference to the accompanying drawing in which the single figure is a diagrammatic view of my improved circuit.

As illustrated in the drawing, I provide a circuit including a transformer 1 having a primary winding 2 and a secondary winding consisting of two portions of equal inductance 3 and 3a which are center tapped at the point 25 between the two portions. Connected to the terminal of the portion 3 of the secondary winding is a rectifying tube 4, or a plurality of rectifying tubes 4, 4a, 4b and 4c filled with an inert gas such as argon, and a similar tube 5, or a plurality of similar tubes 5, 5a, 5b and 5c, are connected to the other terminal of the secondary winding. Each of the tubes includes an anode 6 which may be formed of graphite and a cathode or filament 7 which may be formed of tungsten, a platinum-irridium alloy or a cobalt-nickel alloy containing ferrotitanium, and, if desired, the filament may be provided with an oxide coating. A resistor 8 is connected in series with each of the tubes 4, 4a, 4b and 4c and in a like manner a resistor 9 is connected in series with each of the tubes 5, 5a, 5b and 5c. Current is supplied to the tubes from any suitable source of voltage, such as from the line $L_1$, $L_2$ which may be a single phase or a multiphase source. For instance, the current may be taken from a 120 or a 220 volt source of supply, or if desired, suitable taps 10 and 11 may be provided to provide other voltages.

Before the apparatus is assembled, the tubes are tested with respect to resistance and a resistor 8 is placed in series with the tube 4 which is of such a value that the resistor 8 and the tube 4 will have the same or substantially the same resistance as the resistor 9 and the tube 5. In a like manner the tube 4a, the tube 4b and the tube 4c and the resistor 8 in series with each tube has the same or substantially the same resistance as the corresponding tube 5a, tube 5b and tube 5c respectively, and the resistor 9 in series therewith. It will therefore be seen that I have provided a balanced circuit in which the same amount of current flows through the tube 4 as through the tube 5 and in a like manner the same amount of current flows through the tubes 4a, 4b and 4c as flows through tubes 5a, 5b and 5c, respectively. I have also provided means for cutting out a portion of the tubes without interfering with the balanced system. For instance, switch 12 may be opened, which will cut out tubes 4c and 5c. In a like manner the opening of switch 13 cuts out tubes 4b and 4c connected to the terminal 15 of portion 3 of the secondary winding and 5b and 5c connected to the terminal 16 of the portion 3a of the secondary winding, while the opening of switch 14 leaves only tubes 4 and 5 in the circuit. From the foregoing explanation, it will be seen that one-half of the wave passes through rectifier tube 4 or rectifier tubes 4, 4a, 4b and 4c, if all these tubes are connected in the circuit, while the other half of the wave passes through rectifier tube 5 or rectifier tubes 5, 5a, 5b and 5c if all these tubes are connected in the circuit.

The rectified current from tube 4, or from tubes 4, 4a, 4b and 4c, if all the tubes are in circuit, passes through conductor 17, and the rectified current from the rectifier tube 5 or rectifier tubes 5, 5a, 5b and 5c, if all the tubes are in circuit, passes through the conductor 18, the direct current pulsations being united at 19. The direct current, thus obtained, is filtered to remove alternating current pulsations which may remain as well as direct current pulsations.

The filtering may be accomplished by means of a choke coil 21, which is connected to conductors 17 and 18 at the point 19, and condensers 22 and 23 which are connected across conductor 20 and a conductor 24, one terminal of which is tapped to the midpoint of the secondary winding as indicated by the numeral 25, and the other terminal 26 of which constitutes the negative terminal of the rectified direct current. A resistor 27 is connected between conductors 20 and 24 for the purpose of protecting the tubes from peak values which may occur in breaking the arc. The filtered current then passes to the positive terminal 28 through a resistor 29, conductor 30 and switch 31, or if desired, it may be passed through resistors 29, 32, conductor 33 and switch 31 by moving the switch 31 to the terminal of conductor 33.

The direct current, thus obtained, may be applied for welding purposes and if desired its polarity may be changed by means of a double pole double throw switch 34. When the rectified current is utilized for welding purposes, the choke coil 21 not only serves as part of the filtering means for the voltage but may also be employed as a magnetizing means for the table 37 which is placed in the magnetizing field of choke coil 24 on which the work may be placed. Work placed upon the table will therefore remain in a fixed position.

Secondary coil 35 of transformer 1 is connected to the filament of tube 4 and also to tubes 4a, 4b and 4c when those tubes are connected in the circuit and secondary coil 36 is connected to the filament of tube 5 and also to the filament of tubes 5a, 5b and 5c when those tubes are connected in circuit. Means is thus provided to heat the filament.

From the foregoing description it will be noted that full wave rectification is produced and that the amount of current which flows to the tube or tubes connected to the terminal 15 of secondary winding 3 is equal or substantially equal to the current which flows to the tube or tubes which are connected to the terminal 16 of the secondary winding 3. By this arrangement the load is always balanced, so that one-half of the wave of the alternating current cycle will pass through the tube 4, or tubes 4, 4a, 4b and 4c if all the tubes are connected in circuit, while the other half of the wave of the alternating current cycle passes through the tube 5 or tubes 5, 5a, 5b and 5c if all the tubes are connected in circuit. A balanced arrangement is therefore always provided which enables the full wave to be rectified.

Since the primary purpose of applicant's invention is to provide high current at low voltages, it is essential to utilize gaseous filled rectifier tubes of the diode type. When high vacuum tubes are employed it is necessary to provide a high voltage and since the current is carried almost exclusively by the electrons, such tubes are only suitable for small currents. In applicant's apparatus, however, the voltage is low, being 90 to 130 volts across each secondary winding when the circuit is open and approximately 23 to 30 volts at the arc, and large amounts of current are provided, which is necessary for the various uses designated. The voltage may be varied however by the type of filter used, and particularly with respect to the amount of capacitive reactance in the filter circuit. The current may also be varied. For instance, current of any desired amperage may be provided by increasing or decreasing the number of tubes.

The efficiency of applicant's device is also attributed to the fact that both waves of the alternating current cycle are utilized and that one-half of the wave passes through the tube connected to one portion of the secondary winding and the other half passes through the tube or tubes connected to the other portion of the secondary winding. By this arrangement the rectified current is low in alternating current pulsations and is therefore more satisfactory for welding purposes.

In utilizing applicant's improved circuit for welding purposes, a much more stable arc is provided than when motor-generator sets are employed. It is believed that this is due to the fact that full wave rectification is provided in a balanced circuit and consequently the direct current pulsations are not distorted by alternating current. The filtering of the current also eliminates further alternating current components and removes pulsations from the rectified direct current. In view of the stable arc which is provided there is considerably less sparking and better penetration is obtained. By utilizing applicant's improved circuit and process, thinner sheets may also be welded.

Another important feature of my invention is that I am able by my improved apparatus and by the use of a balanced circuit and gas filled tubes, to utilize alternating current from a single phase source for welding or other purposes mentioned. I do not desire, however, to limit my invention to rectifying current from a single phase source, because current may also be rectified by my improved apparatus from a multiphase source, such as from a three phase source of supply.

What I claim is:

1. An electric circuit for rectifying alternating current in which rectified current having a comparatively low voltage and a high amperage is obtained, comprising a source of alternating current, a transformer, a center tapped secondary winding, a gas filled rectifier tube of the diode type connected to one terminal of the secondary winding, a similar gas filled rectifier tube being connected to the other terminal of the secondary winding, and a resistor in series with each tube, said resistors being of such a value that substantially the same amount of current is passed through each tube, and means for uniting the direct current pulsations.

2. An electric circuit for rectifying alternating current in which rectified current having a comparatively low voltage and a high amperage is obtained comprising a source of alternating current, a transformer, a center tapped secondary winding, a gas filled rectifier tube of the diode type connected to one terminal of the secondary winding, a similar gas filled rectifier tube being connected to the other terminal of the secondary winding, a resistor in series with each tube, said resistors being of such a value that an equal amount of current is passed through each tube, means for uniting the direct current pulsations, and means for filtering the rectified current.

3. An electric circuit for rectifying alternating current in which rectified current having a comparatively low voltage and a high amperage is obtained, comprising a source of alternating current, a transformer, a center tapped secondary winding, a plurality of gas filled tubes connected to one terminal of the secondary winding, a plurality of gas filled rectifying tubes connected to the other terminal of the secondary winding, means providing substantially equal resistance between the tubes connected to one terminal of the secondary winding and the tubes connected to the other terminal of the secondary winding, and means for uniting the direct current pulsations.

4. An electric circuit for rectifying alternating current in which rectified current having a comparatively low voltage and a high amperage is obtained, comprising a source of alternating current, a transformer, a center tapped secondary winding, a plurality of gas filled tubes connected to one terminal of the secondary winding, a plurality of gas filled rectifying tubes connected to the other terminal of the secondary winding, means providing substantially equal resistance between the tubes connected to one terminal of the secondary winding and the tubes connected to the other terminal of the secondary winding, means for uniting the direct current pulsations, and means for filtering the rectified current.

5. An electric circuit for rectifying alternating current in which a rectified current having a comparatively low voltage and a high amperage is obtained, comprising a source of alternating current, a transformer, a center tapped secondary winding, a series of gas filled rectifier tubes connected to one terminal of the secondary winding, a series of gas filled rectifier tubes connected to the other terminal of the secondary winding, a resistor connected in series with each tube, the resistors and tubes connected to one terminal of the secondary winding being substantially equal to the resistance of the resistors and tubes connected to the other terminal of the secondary winding, and means for eliminating one or more tubes from each of the series of tubes while still preserving the similarity of resistance between the tubes and resistors connected to each terminal of the secondary winding.

6. An electric circuit for rectifying alternating current comprising a source of alternating current, a transformer, a center tapped secondary winding, a gas filled rectifier tube of the diode type connected to one terminal of the secondary winding, a similar gas filled rectifier tube of the diode type connected to the other terminal of the secondary winding, a positive lead connected to the filaments of said tubes, and a negative lead connected to the center tapping of the secondary winding, said leads being adapted to complete a circuit when the free ends are electrically connected, and a resistor connected between the leads for protecting the tubes from peak voltages occurring when the circuit is broken.

7. An electric circuit for rectifying alternating current comprising a transformer, a center tapped secondary winding, a gas filled rectifier tube of the diode type connected to one terminal of the secondary winding, a similar gas filled rectifier tube of the diode type connected to the other terminal of the secondary winding, a resistor in series with each tube, said resistors having an ohmic resistance of such value that substantially the same amount of current is passed through each tube, a positive lead connected to the filaments of said tubes, a negative lead connected to the center tapping of the secondary winding, said leads being adapted to complete a circuit when their free ends are electrically connected together, and a resistor connected between the leads for protecting the tubes from peak voltages occurring when the circuit is broken.

8. An electric circuit for rectifying alternating current comprising a source of alternating current, a transformer, a center tapped secondary winding, a gas filled rectifier tube of the diode type connected to one terminal of the secondary winding, a similar gas filled rectifier tube of the diode type connected to the other terminal of the secondary winding, a resistor in series with each tube, said resistors having an ohmic resistance of such value that substantially the same amount of current is passed through each tube, means for filtering the rectified current including a choke coil, a positive lead connected to said choke coil, a negative lead connected to the center tapping of the secondary winding, said leads being adapted to complete a circuit when their free ends are electrically connected, and a resistor connected between the leads for protecting the tubes from peak voltages occurring when the current is broken.

9. An electric circuit for rectifying alternating current comprising a source of alternating current, a transformer, said transformer having a center tapped secondary winding, a gas-filled rectifier tube of the diode type having an anode and a cathode, the anode being connected to one terminal of the secondary winding, and a second gas-filled tube of the diode type having an anode and a cathode, the anode of the second tube being connected to the other terminal of the secondary winding, a resistor connected in series with the anode of each tube, said resistors having such ohmic resistance that each tube and its corresponding resistor has substantially the same electrical resistance as the other tube and its resistor, a second secondary winding of said transformer, the opposite terminals of which are provided with conductors connected to the ends of the cathode of one tube, one of which extends beyond the tube, a third secondary winding of said transformer of substantially the same inductance as the second secondary winding, the terminals of the third secondary winding being provided with conductors each of which is connected with the terminals of the cathode of the second tube and one of which extends beyond the tube and is connected to the conductor extending beyond the first tube to form the positive terminal of the rectified current, the negative terminal of the rectified current being connected to the center tapping of the first mentioned secondary transformer.

10. An electrical circuit for rectifying alternating current comprising a source of alternating current, a transformer, said transformer having a center tapped secondary winding, a first series of gas-filled rectifier tubes of the diode type, each having an anode and a cathode, the anodes of said tubes being electrically connected in parallel to one terminal of the secondary winding, a second series of gas-filled rectifier tubes of the diode type each having an anode and a cathode, the anodes of which are connected in parallel to the other terminal of the secondary winding, a resistor connected in series with the anode of each of said tubes, each of the resistors and tubes in the series connected to one terminal of the secondary winding being substantially equal in resistance to the corresponding resistor and tube in the series connected to the other terminal of the secondary winding, a second secondary winding of said transformer, the opposite terminals of which are provided with conductors connected to the ends of the cathodes of the first series of tubes, a third secondary winding, of substantially the same inductance as the second secondary transformer, the terminals of which are provided with conductors connected to the ends of the cathodes of the second series of tubes, the conductors leading from one terminal of the second secondary transformer and one terminal of the third secondary winding being connected together beyond the tubes to form the positive conductor of the rectified current, and the conductors leading from the other terminals of the second and third secondary windings being each provided with a series of switches, the corresponding switches in each conductor being interconnected for regulating the number of effective tubes in the system, and the negative terminal of the rectified current being electrically connected to the center tapping of the first-mentioned secondary winding.

NEIL CARLTON HUGUS.